(12) United States Patent
Grabinger et al.

(10) Patent No.: US 8,084,982 B2
(45) Date of Patent: Dec. 27, 2011

(54) HVAC ACTUATOR WITH OUTPUT TORQUE COMPENSATION

(75) Inventors: Cory Grabinger, Maple Grove, MN (US); Nathan Carlson, Maple Grove, MN (US); Ivo Chromy, Brno (CZ); David Cermak, Hustopece (CZ)

(73) Assignee: Honeywell International Inc., Morristown, NJ (US)

( * ) Notice: Subject to any disclaimer, the term of this patent is extended or adjusted under 35 U.S.C. 154(b) by 496 days.

(21) Appl. No.: 12/273,413

(22) Filed: Nov. 18, 2008

(65) Prior Publication Data

US 2010/0123421 A1    May 20, 2010

(51) Int. Cl.
*G05B 13/00* (2006.01)

(52) U.S. Cl. .................. 318/561; 318/558; 318/634

(58) Field of Classification Search .......... 318/561, 318/558, 634, 601, 400.32, 432, 434, 567; 251/129.01
See application file for complete search history.

(56) References Cited

U.S. PATENT DOCUMENTS

| | | | |
|---|---|---|---|
| 23,902 A | 5/1859 | Cope et al. |
| 105,925 A | 8/1870 | Eastman |
| 2,414,947 A | 1/1947 | Heinze |
| 2,761,647 A | 9/1956 | Zeck |
| 2,965,354 A | 12/1960 | Grove et al. |
| 3,569,810 A | 3/1971 | Thiele |
| 3,579,072 A | 5/1971 | Plummer et al. |
| 3,742,267 A | 6/1973 | Papst et al. |
| 3,750,780 A | 8/1973 | Danek |
| 3,807,709 A | 4/1974 | Suda et al. |
| 3,839,662 A | 10/1974 | N'Guyen Van |
| 3,931,557 A | 1/1976 | Osburn |
| 3,937,974 A | 2/1976 | Lafuze |
| 3,967,227 A | 6/1976 | Clarke et al. |
| 4,027,216 A | 5/1977 | Rozek |
| 4,038,589 A | 7/1977 | Heyne et al. |
| 4,086,519 A | 4/1978 | Persson |
| 4,090,434 A | 5/1978 | Krisko et al. |
| 4,099,704 A | 7/1978 | Okumura et al. |

(Continued)

FOREIGN PATENT DOCUMENTS

CH    320865    4/1957

(Continued)

OTHER PUBLICATIONS

US 5,428,170, 6/1995, Labriola, II (withdrawn).

(Continued)

*Primary Examiner* — Karen Masih
(74) *Attorney, Agent, or Firm* — Seager, Tufte & Wickhem LLC

(57) ABSTRACT

An HVAC actuator, such as a spring return actuator, may adjust the maximum output torque of the motor with the varying spring return force of the HVAC actuator as the HVAC actuator moves through its range of motion. In some cases, this may provide a more constant force at the output of the HVAC actuator and reduce the force that is applied through the motor, drive train and/or the HVAC component when an end stop is reached. Also, an HVAC actuator is disclosed that can be configured to discover and store the location of one or more end stop(s), and to slow the speed of the motor down before the end stop(s) is reached. This may reduce the force that is applied through the motor, drive train and/or the HVAC component when an end stop is reached.

21 Claims, 5 Drawing Sheets

U.S. PATENT DOCUMENTS

| | | |
|---|---|---|
| 4,139,807 A | 2/1979 | Hucker |
| 4,177,716 A | 12/1979 | Bowe et al. |
| 4,227,664 A | 10/1980 | Skutecki |
| 4,251,024 A | 2/1981 | Feinberg |
| 4,286,303 A | 8/1981 | Genheimer et al. |
| 4,292,802 A | 10/1981 | Snow |
| 4,295,085 A | 10/1981 | Lafuze |
| 4,311,950 A | 1/1982 | Goldin et al. |
| 4,315,202 A | 2/1982 | Dawson et al. |
| 4,322,668 A | 3/1982 | Trussler et al. |
| 4,337,821 A | 7/1982 | Saito |
| 4,364,004 A | 12/1982 | Bourbeau |
| 4,364,111 A | 12/1982 | Jocz |
| 4,364,301 A | 12/1982 | Kawabata et al. |
| 4,372,485 A | 2/1983 | McCabe |
| 4,379,986 A | 4/1983 | Baxter et al. |
| 4,393,597 A | 7/1983 | Picard et al. |
| 4,407,264 A | 10/1983 | Pettorino |
| 4,414,498 A | 11/1983 | Gessner |
| 4,422,028 A | 12/1983 | Godwin et al. |
| 4,423,362 A | 12/1983 | Konrad et al. |
| 4,423,364 A | 12/1983 | Kompelien et al. |
| 4,424,472 A | 1/1984 | Jacot-Descombes et al. |
| 4,424,799 A | 1/1984 | Patterson |
| 4,434,932 A | 3/1984 | Hara et al. |
| 4,439,139 A | 3/1984 | Nelson et al. |
| 4,445,075 A | 4/1984 | Fry |
| 4,456,166 A | 6/1984 | Kagohata |
| 4,458,583 A | 7/1984 | Fukui et al. |
| 4,473,783 A | 9/1984 | Vermesse |
| 4,473,856 A | 9/1984 | Takahashi et al. |
| 4,491,775 A | 1/1985 | Harvey et al. |
| 4,501,155 A | 2/1985 | Garritano |
| 4,530,395 A | 7/1985 | Parker et al. |
| 4,531,450 A | 7/1985 | Yamada et al. |
| 4,546,293 A | 10/1985 | Peterson et al. |
| 4,547,715 A | 10/1985 | Li |
| 4,547,720 A | 10/1985 | Loudon |
| 4,556,194 A | 12/1985 | Van Lingen |
| 4,557,418 A | 12/1985 | Leemhuis |
| 4,572,333 A | 2/1986 | Westley |
| 4,578,605 A | 3/1986 | Reinhardt et al. |
| 4,591,773 A | 5/1986 | Numata |
| 4,591,774 A | 5/1986 | Ferris et al. |
| 4,591,775 A | 5/1986 | Nussel et al. |
| 4,608,527 A | 8/1986 | Glennon et al. |
| 4,613,798 A | 9/1986 | Baumann |
| 4,618,808 A | 10/1986 | Ish-Shalom et al. |
| 4,623,826 A | 11/1986 | Benjamin et al. |
| 4,633,152 A | 12/1986 | Farr |
| 4,651,068 A | 3/1987 | Meshkat-Razavi |
| 4,656,407 A | 4/1987 | Burney |
| 4,656,410 A | 4/1987 | Shibata |
| 4,659,973 A | 4/1987 | Stich |
| 4,691,689 A | 9/1987 | Shepherd et al. |
| 4,701,839 A | 10/1987 | McNally et al. |
| 4,704,569 A | 11/1987 | Mallick, Jr. et al. |
| 4,720,792 A | 1/1988 | Kasai et al. |
| 4,725,765 A | 2/1988 | Miller |
| 4,746,850 A | 5/1988 | Abbondanti |
| 4,751,438 A | 6/1988 | Markunas |
| 4,771,643 A | 9/1988 | Mott |
| 4,780,653 A | 10/1988 | Bezos et al. |
| 4,818,908 A | 4/1989 | Tamae et al. |
| 4,823,063 A | 4/1989 | Barba et al. |
| 4,825,138 A | 4/1989 | Platzer et al. |
| 4,834,282 A | 5/1989 | Tenorio et al. |
| 4,835,448 A | 5/1989 | Dishner et al. |
| 4,839,579 A | 6/1989 | Ito et al. |
| 4,844,110 A | 7/1989 | Paley |
| 4,844,115 A | 7/1989 | Bowers |
| 4,888,533 A | 12/1989 | Gotoh et al. |
| 4,897,583 A | 1/1990 | Rees |
| 4,937,508 A | 6/1990 | Rozman |
| 4,939,441 A | 7/1990 | Dhyanchand |
| 4,949,021 A | 8/1990 | Rozman et al. |
| 4,969,756 A | 11/1990 | Villec et al. |
| 4,985,666 A | 1/1991 | Nakabayashi |
| 5,012,168 A | 4/1991 | Dara et al. |
| 5,017,846 A | 5/1991 | Young et al. |
| 5,020,423 A | 6/1991 | Hill |
| 5,029,263 A | 7/1991 | Rozman |
| 5,038,062 A | 8/1991 | Shiraki |
| 5,047,681 A | 9/1991 | Gaillard et al. |
| 5,053,688 A | 10/1991 | Rees |
| 5,053,689 A | 10/1991 | Woodson et al. |
| 5,081,405 A | 1/1992 | Nelson |
| 5,087,866 A | 2/1992 | Smith |
| 5,096,156 A | 3/1992 | Wylie et al. |
| 5,097,189 A | 3/1992 | Ito et al. |
| 5,113,125 A | 5/1992 | Stacey |
| 5,117,900 A | 6/1992 | Cox |
| 5,132,602 A | 7/1992 | Jorgensen et al. |
| 5,139,230 A | 8/1992 | Lester |
| 5,151,063 A | 9/1992 | Tanaka et al. |
| 5,153,493 A | 10/1992 | Jornod et al. |
| 5,168,202 A | 12/1992 | Bradshaw et al. |
| 5,169,121 A | 12/1992 | Blanco et al. |
| 5,182,498 A | 1/1993 | Stuhr |
| 5,200,661 A | 4/1993 | Shramo et al. |
| 5,251,815 A | 10/1993 | Foye |
| 5,274,315 A | 12/1993 | Finocchi |
| 5,291,106 A | 3/1994 | Murty et al. |
| 5,363,025 A | 11/1994 | Colling |
| 5,367,236 A | 11/1994 | Salazar |
| 5,373,205 A | 12/1994 | Busick et al. |
| 5,384,527 A | 1/1995 | Rozman et al. |
| 5,406,186 A | 4/1995 | Fair |
| 5,409,194 A | 4/1995 | Blanc et al. |
| 5,416,397 A | 5/1995 | Mazzara et al. |
| 5,416,652 A | 5/1995 | Lewis |
| 5,425,165 A | 6/1995 | Shramo et al. |
| 5,429,090 A | 7/1995 | Kotchi et al. |
| 5,430,362 A | 7/1995 | Carr et al. |
| 5,440,486 A | 8/1995 | Rudzewicz et al. |
| 5,449,986 A | 9/1995 | Dozor |
| 5,450,999 A | 9/1995 | Scholten et al. |
| 5,461,293 A | 10/1995 | Rozman et al. |
| 5,467,808 A | 11/1995 | Bell |
| 5,488,286 A | 1/1996 | Rozman et al. |
| 5,493,200 A | 2/1996 | Rozman et al. |
| 5,495,162 A | 2/1996 | Rozman et al. |
| 5,495,163 A | 2/1996 | Rozman et al. |
| 5,497,326 A | 3/1996 | Berland et al. |
| 5,513,611 A | 5/1996 | Ricouard |
| 5,514,947 A | 5/1996 | Berg |
| 5,517,415 A | 5/1996 | Miller et al. |
| 5,519,295 A | 5/1996 | Jatnicks |
| 5,519,546 A | 5/1996 | Lewis |
| 5,550,449 A | 8/1996 | Ege et al. |
| 5,565,750 A | 10/1996 | Padgett |
| 5,567,874 A | 10/1996 | Suzuki et al. |
| 5,587,641 A | 12/1996 | Rozman |
| 5,594,322 A | 1/1997 | Rozman et al. |
| 5,610,457 A | 3/1997 | Kurita |
| 5,617,001 A | 4/1997 | Nacewicz et al. |
| 5,619,085 A | 4/1997 | Shramo |
| 5,656,911 A | 8/1997 | Nakayama et al. |
| 5,677,605 A | 10/1997 | Cambier et al. |
| 5,703,473 A | 12/1997 | Phillips et al. |
| 5,710,498 A | 1/1998 | Yutkowitz et al. |
| 5,710,755 A | 1/1998 | Chen |
| 5,723,918 A | 3/1998 | Schilling et al. |
| 5,740,880 A | 4/1998 | Miller |
| 5,744,921 A | 4/1998 | Makaran |
| 5,760,707 A | 6/1998 | Katagiri |
| 5,767,643 A | 6/1998 | Pham et al. |
| 5,775,415 A | 7/1998 | Yoshimi et al. |
| 5,777,447 A | 7/1998 | Okano |
| 5,793,180 A | 8/1998 | Maiocchi et al. |
| 5,796,194 A | 8/1998 | Archer et al. |
| 5,798,196 A | 8/1998 | Okino |
| 5,804,696 A | 9/1998 | Seberger et al. |
| 5,814,962 A | 9/1998 | Mizumoto |
| 5,815,381 A | 9/1998 | Newlin |
| 5,835,302 A | 11/1998 | Funches et al. |
| 5,850,130 A | 12/1998 | Fujisaki et al. |

| | | | | | | |
|---|---|---|---|---|---|---|
| 5,859,518 A | 1/1999 | Vitunic | | 6,791,219 B1 | 9/2004 | Eric et al. |
| 5,874,796 A | 2/1999 | Petersen | | 6,798,635 B2 | 9/2004 | Olsson |
| 5,876,014 A | 3/1999 | Noritake et al. | | 6,801,011 B2 | 10/2004 | Ide |
| 5,912,542 A | 6/1999 | Zalesski | | 6,812,667 B2 | 11/2004 | Yasohara et al. |
| 5,912,543 A | 6/1999 | Mahr et al. | | 6,822,409 B2 | 11/2004 | Lange et al. |
| 5,921,277 A | 7/1999 | Bernal | | 6,826,499 B2 | 11/2004 | Colosky et al. |
| 5,923,728 A | 7/1999 | Ikkai et al. | | 6,828,752 B2 | 12/2004 | Nakatsugawa et al. |
| 5,964,455 A | 10/1999 | Catanzarite et al. | | 6,828,919 B1 | 12/2004 | Gold |
| 5,970,997 A | 10/1999 | Hudson et al. | | 6,874,468 B2 | 4/2005 | Watanabe |
| 5,983,890 A | 11/1999 | Thomas et al. | | 6,900,607 B2 | 5/2005 | Kleinau et al. |
| 5,986,369 A | 11/1999 | Hanley et al. | | 6,900,613 B2 | 5/2005 | Hirono |
| 5,986,419 A | 11/1999 | Archer et al. | | 6,911,794 B2 | 6/2005 | Maslov et al. |
| 5,990,643 A | 11/1999 | Holling et al. | | 6,914,399 B2 | 7/2005 | Kushion et al. |
| 5,995,710 A | 11/1999 | Holling et al. | | 6,940,241 B2 | 9/2005 | Lange et al. |
| 6,002,234 A | 12/1999 | Ohm et al. | | 6,954,044 B2 | 10/2005 | McMillian et al. |
| 6,049,194 A | 4/2000 | Nakagawa et al. | | 7,021,072 B2 | 4/2006 | McMillian et al. |
| 6,051,948 A | 4/2000 | Vepy | | 7,188,481 B2 | 3/2007 | DeYoe et al. |
| 6,061,258 A | 5/2000 | Galbiati et al. | | 7,265,512 B2 | 9/2007 | McMillian et al. |
| 6,075,332 A | 6/2000 | McCann | | 7,446,494 B2 | 11/2008 | Grabinger et al. |
| 6,076,368 A | 6/2000 | Noble | | 7,637,245 B2 | 12/2009 | Katsuno et al. |
| 6,078,158 A | 6/2000 | Heeren et al. | | 2004/0211200 A1 * | 10/2004 | McMillan et al. .............. 62/186 |
| 6,078,204 A | 6/2000 | Cooper et al. | | 2005/0034539 A1 | 2/2005 | Tan et al. |
| 6,084,365 A | 7/2000 | Anderson et al. | | 2008/0051024 A1 | 2/2008 | Caliendo et al. |
| 6,105,927 A | 8/2000 | Zelczer et al. | | 2008/0303475 A1 * | 12/2008 | Patel et al. .................... 318/634 |
| 6,114,827 A | 9/2000 | Alvaro | | | | |
| 6,140,626 A | 10/2000 | McKee et al. | | FOREIGN PATENT DOCUMENTS | | |
| 6,164,623 A | 12/2000 | Ito et al. | | | | |
| 6,181,091 B1 | 1/2001 | Heeren et al. | | DE | 3402759 | 8/1985 |
| 6,181,557 B1 | 1/2001 | Gatti | | DE | 4218782 | 1/1993 |
| 6,198,243 B1 | 3/2001 | Ritmanich et al. | | DE | 4234421 | 4/1994 |
| 6,222,333 B1 | 4/2001 | Garnett et al. | | EP | 0895346 | 2/1999 |
| 6,236,179 B1 | 5/2001 | Lawler et al. | | JP | 63112209 | 5/1988 |
| 6,244,564 B1 | 6/2001 | Noritake | | JP | 02-21076 | 1/1990 |
| 6,246,232 B1 | 6/2001 | Okumura | | JP | 10300182 | 11/1998 |
| 6,249,100 B1 | 6/2001 | Lange | | JP | 11002147 | 1/1999 |
| 6,271,641 B1 | 8/2001 | Yasohara et al. | | JP | 11311133 | 11/1999 |
| 6,279,374 B1 | 8/2001 | Irokawa et al. | | JP | 2001/258288 | 9/2001 |
| 6,307,336 B1 | 10/2001 | Goff et al. | | JP | 2002070588 | 3/2002 |
| 6,313,601 B1 | 11/2001 | Kubo et al. | | WO | WO 98/39787 | 9/1998 |
| 6,318,966 B1 | 11/2001 | Madara et al. | | WO | WO 03/061123 | 7/2003 |
| 6,324,085 B2 | 11/2001 | Kimura et al. | | | | |
| 6,326,758 B1 | 12/2001 | Discenzo | | OTHER PUBLICATIONS | | |

6,329,777 B1 12/2001 Itabashi et al.
6,348,752 B1 2/2002 Erdman et al.
6,364,211 B1 4/2002 Saleh
6,367,337 B1 4/2002 Schlabach
6,369,540 B1 4/2002 Lange et al.
6,373,207 B1 4/2002 Yablonovitch
6,373,211 B1 4/2002 Henry et al.
6,407,524 B1 6/2002 Endo et al.
6,414,408 B1 7/2002 Erdman et al.
6,418,891 B2 7/2002 Kobayashi
6,446,539 B1 9/2002 Niessen
6,495,981 B2 12/2002 Romanowich et al.
6,508,072 B1 1/2003 Kanazawa et al.
6,524,209 B2 2/2003 Ito et al.
6,548,981 B1 4/2003 Ishii et al.
6,549,871 B1 4/2003 Mir et al.
6,557,826 B2 5/2003 Moore et al.
6,577,097 B2 6/2003 Krefta et al.
6,577,978 B1 6/2003 Annan et al.
6,580,235 B2 6/2003 Laurent
6,593,716 B1 7/2003 Lange et al.
6,605,912 B1 8/2003 Bharadwaj et al.
6,626,002 B1 9/2003 Notohara et al.
6,631,781 B2 10/2003 Williams et al.
6,647,329 B2 11/2003 Kleinau et al.
6,655,652 B2 12/2003 Meinhof
6,683,427 B2 1/2004 Desbiolles et al.
6,686,713 B2 2/2004 Desbiolles et al.
6,694,287 B2 2/2004 Mir et al.
6,732,438 B2 5/2004 Enzinna
6,741,048 B2 5/2004 Desbiolles et al.

"Belimo Direct Coupled Actuators Spring Return, TF, LF, NF, AF Series," Kele Catolog, 2 pages, 2008.
"Johnson Controls Direct Coupled Actuators Spring Return, M9200 Series," Kele Catolog, 2 pages, 2008.
"Siemens Direct Coupled Actuators Spring Return, GMA, GCA Series," Kele Catolog, 2 pages, 2008.
"Siemens Direct Coupled Actuators Spring Return, GMA, GCA Series," Kele Solutions, 2 pages, 2001.
"SimpleServo Technical Section," 19 pages, prior to Aug. 30, 2005.
"TAC Direct Coupled Actuators Spring Return, MA, MF, MS Series," Kele Catalog 2 pages, 2008.
Analog Devices Inc., "Current Loop Control of a Brushless DC Motor with Hall Sensors Using the ADMC401," 19 pages, Oct. 2001.
Horowitz et al., XP-002297359, Field-Effect Transistors, Chapter 3, 5 pages, 1998.
http://www.drbrushless.com/articles/advuni/, "Advanced Unipolar PWM Technique," 2 pages, printed Aug. 12, 2005.
http://www.drbrushless.com/articles/dcbctheory/, "DC Brushless Commutation Theory Basics," 1 page, printed Aug. 12, 2005.
http://www.drbrushless.com/articles/smartini/, "Smart Position Initialization Procedure for Sinusoidal Brushless Motor with Incremental Encoder without Hall Sensors in the Presence of Load Torque," 3 pages, printed Aug. 12, 2005.
http://www.wikipedia.org/wiki/Brushless Motor, "Brushless DC Electric Motor," 2 pages, printed Aug. 4, 2005.
Morgan, "Spectra Motor Rotation Control," 4 pages, prior to Nov. 18, 2008.

* cited by examiner

HVAC ACTUATOR WITH OUTPUT TORQUE COMPENSATION

TECHNICAL FIELD

The disclosure relates generally to HVAC actuators.

BACKGROUND

HVAC actuators such as spring return actuators are used in a wide variety of applications, including but not limited to air dampers, water valves and the like. Typically, a spring return actuator has a motor that drives a drive train. The drive train often functions as a sort of transmission, turning a low torque, high speed motor output into a high torque, low speed drive train output that is sufficient to open an air damper, a water valve, or the like. A spring return actuator may have one or more return springs that oppose a driving direction of the motor. For example, a spring return actuator may be configured such that the motor drives an HVAC component (e.g. damper) from a closed position to an open position, while the return spring drives the HVAC component from the open position to the closed position. In other cases, a spring return actuator may be configured such that the motor drives an HVAC component from an open position to a closed position, while the return spring drives the HVAC component from the closed position to the open position.

In many spring return actuators, the motor produces a constant maximum output torque while the opposing force produced by the return spring varies in accordance with the relative displacement of the spring as the actuator moves between open and closed positions. The constant maximum output torque of the motor is often set to meet a minimum torque rating (e.g. 5 N·m, 10 N·m, etc.) at the HVAC component across the full range of motion of the actuator.

In some cases, a spring return actuator may have one or more end stops, either internally within the spring return actuator itself or perhaps in conjunction with the HVAC component that is driven by the spring return actuator. When the motor moves the spring return actuator and impacts an end stop, force is transferred through the motor, drive train and/or the HVAC component. Because the torque of the motor is often set to meet a minimum torque rating (e.g. 5 nm, 10 nm, etc.) at the HVAC component across the full range of motion of the actuator, the torque produced by the motor and thus the force that is transferred through the motor, drive train and/or the HVAC component when an end stop is impacted can be significantly higher than the minimum torque rating of the actuator. This is particularly so when an end stop is reached when the return spring is not fully displaced, i.e. not providing a maximum opposing force to the motor. As such, the drive train and related components often must be built to withstand substantially higher torques than the minimum torque rating of the actuator. This, however, can significantly increase the cost of such spring return actuators.

SUMMARY

The disclosure relates generally to HVAC actuators, and more particularly, to a spring return actuator that can adjust the maximum output torque of the motor with the varying spring return force of the HVAC actuator as the HVAC actuator moves through its range of motion. In some cases, this may provide a more constant force to the HVAC component and reduce the force that is applied through the motor, drive train and/or the HVAC component when an end stop is reached. The disclosure also relates to an HVAC actuator that is configured to discover and store the location of one or more end stop(s), and to slow the motor down before the end stop(s) is reached. This may reduce the force that is applied through the motor, drive train and/or the HVAC component when an end stop is reached.

In an illustrative but non-limiting example of the disclosure, a spring return actuator may include a motor as well as a drive train that is engaged with the motor, wherein the drive train is configured to drive an HVAC component across a range of motion. The spring return actuator may include a return spring that is in opposition to a driving direction of the motor. A controller may be configured to regulate the maximum output torque of the motor in accordance with a varying opposing torque provided by the return spring, such that the drive train outputs a relatively constant maximum output torque to the HVAC component when the HVAC component is being driven through at least part of its range of motion.

Another illustrative but non-limiting example of the disclosure may be found in a spring return actuator that is configured to actuate an HVAC component. The spring return actuator may include a motor and a drive train that is engaged with the motor. The drive train may have an output that rotates between a closed position and an open position, thereby defining a range of motion between the closed position and the open position. The spring return actuator may include a controller that controls the motor by providing the motor with a maximum torque output limit that varies over the range of motion.

Another illustrative but non-limiting example of the disclosure may be found in an actuator that includes a motor and a drive train that is engaged with the motor such that the drive train is configured to drive an HVAC component from a closed position to an open position (or visa-versa). The actuator may include a return spring that drives the HVAC component from the open position to the closed position (or visa-versa). A controller may be configured to regulate a torque output of the motor so that the drive train provides a relatively constant maximum torque to the HVAC component when driving the HVAC component from the closed position to the open position (or visa-versa).

The above summary is not intended to describe each and every disclosed embodiment or every implementation of the disclosure. The Description that follows more particularly exemplify the various illustrative embodiments.

BRIEF DESCRIPTION OF THE FIGURES

The following description should be read with reference to the drawings. The drawings, which are not necessarily to scale, depict selected embodiments and are not intended to limit the scope of the disclosure. The disclosure may be more completely understood in consideration of the following detailed description of various embodiments in connection with the accompanying drawings, in which.

Figure 1:
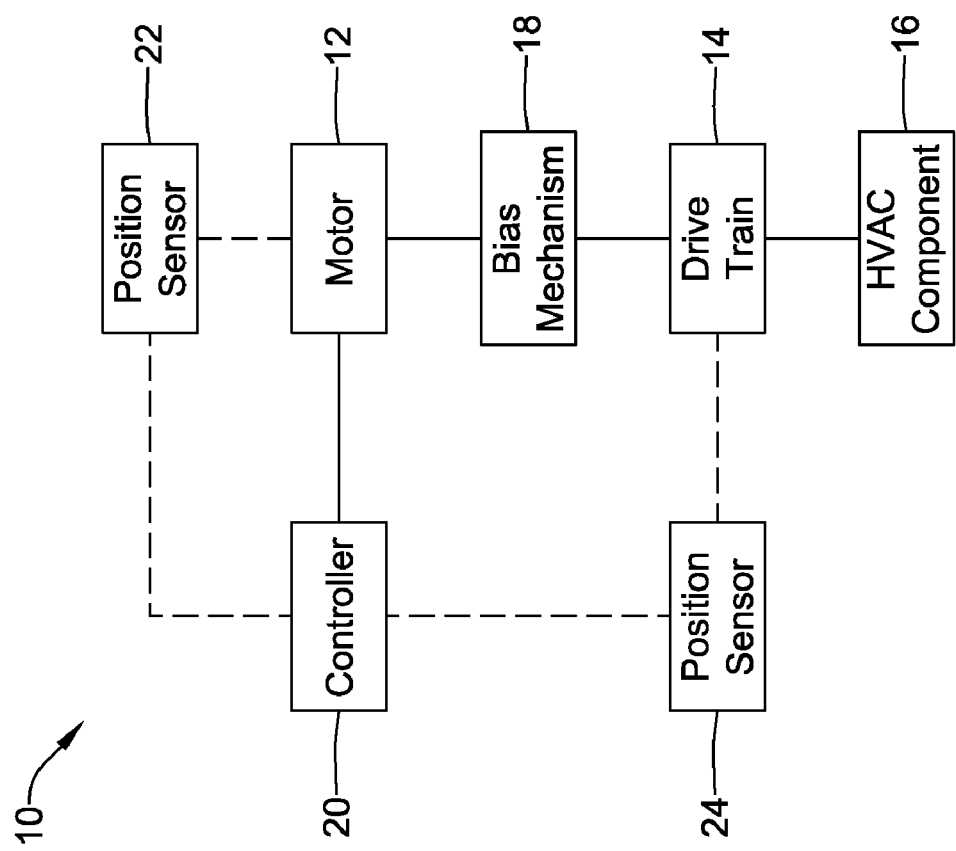
FIG. 1 is a schematic view of an illustrative but non-limiting spring return actuator.

While the invention is amenable to various modifications and alternative forms, specifics thereof have been shown by way of example in the drawings and will be described in detail. It should be understood, however, that the intention is not to limit the invention to the particular illustrative embodiments described. On the contrary, the intention is to cover all modifications, equivalents, and alternatives falling within the spirit and scope of the invention.

DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

The disclosure relates generally to HVAC component actuators such as spring return actuators. While an HVAC component actuator is described and shown as a spring return actuator, it will be appreciated that in some cases, the HVAC component actuator may not include a return spring or other biasing structure. For example, and in some instances, the HVAC component actuator may use a motor to drive an HVAC component in both directions, rather than using a motor to drive in a first direction and a return spring or other biasing structure to drive the HVAC component in a second direction. In some cases, an HVAC component actuator may include an on-board power supply such as a battery that can be used as a fail-safe in powering the motor long enough to drive an HVAC component in a desired direction in the case of a power failure.

FIG. 1 shows an illustrative but non-limiting example of a spring return actuator 10. Spring return actuator 10 may be considered as including a motor 12. It is contemplated that motor 12 may be a DC motor, an AC motor, a stepper motor, or any other suitable type of motor, as desired. The torque output of motor 12 may be adjustable by, for example, altering the current (or voltage) that is applied to motor 12. Likewise, the maximum output torque of the motor 12 may be set by limiting or clipping the current (or voltage) that is applied to motor 12.

In the illustrative embodiment, motor 12 may engage with a drive train 14. In some cases, drive train 14 may function as a transmission, taking a relatively high speed, low torque output from motor 12 and turning it into a relatively low speed, high torque output that is suitable for driving an HVAC component 16 between two or more positions. HVAC component 16 may, for example, be an air damper, a fluid valve such as a ball valve, or the like. In some instances, the particular gearing present within drive train 14 may be customized to provide an appropriate balance of speed and torque, depending on the physical characteristics and/or requirements of HVAC component 16. It will be appreciated, for example, that the torque necessary to open and/or close an air damper may be quite different than the torque needed to open and/or close a liquid valve such as a ball valve. The drive train 14 may be configured to have an appropriate speed reduction and thus provide an appropriate level of torque. For example, drive train 14 may provide a speed reduction of about 1000:1, about 2000:1, about 3000:1, or any other suitable speed reduction as desired.

In some instances, spring return actuator 10 may include a bias mechanism 18. While bias mechanism is schematically illustrated as being disposed between motor 12 and drive train 14, it will be appreciated that this is not necessary in all situations. In some cases, for example, bias mechanism 18 may instead be disposed between drive train 14 and HVAC component 16, between HVAC component 16 and a fixed bracket or duct, or at any other suitable location. Bias mechanism 18 may be any suitable structure that can provide a bias force that opposes at least one driving direction of motor 12. In some cases, bias mechanism 18 may be a resilient material such as a rubber, a gas cylinder, a hydraulic component, or the like. In some instances, bias mechanism 18 may be one or more return springs. If, for example, motor 12 drives HVAC component 16 in a first direction, bias mechanism 18 may drive HVAC component 16 in an opposing direction.

In some cases, spring return actuator 10 may include a controller 20. Controller 20 may, for example, monitor and/or adjust the speed of motor 12. In some cases, controller 20 may alter the speed of motor 12 in order to slow down the motor 12 when approaching an end stop in drive train 14 and/or HVAC component 16. In some cases, spring return actuator 10 may include one or more sensors that are in communication with controller 20 to provide controller 20 with information pertaining to the speed of motor 12 and/or the relative position of motor 12, drive train 14 and/or HVAC component 16. In some illustrative embodiments, spring return actuator 10 may include a first position sensor 22 that is disposed proximate to motor 12 and that is in communication with controller 20 as well as a second position sensor 24 that is disposed proximate to drive train 14 and that is in communication with controller 20. Spring return actuator 10 may include both first position sensor 22 and second position sensor 24. In some cases, one or both of the position sensors may be omitted or perhaps replaced with any other desired type of position or speed sensor, as desired. An optical encoder may be used as a sensor, if desired.

In some cases, the first position sensor 22 may be a sensor that outputs a signal related to motor rotation. For example, first position sensor 22 may be a Hall sensor that outputs an incremental signal that represents motor rotations, although other types of sensors may be used. Second position sensor 24 may be a position potentiometer sensor, but this is not required. In some instances, such as if first position sensor 22 is a Hall sensor, there may be a known relationship between Hall counts and motor rotation that can be used to ascertain how many rotations motor 12 has undergone, and thus determine a position of drive train 14. Controller 20 may rely upon both sensors, or may, in some cases, operate in accordance with a signal from first position sensor 22 as long as it is in relative agreement with a signal from second position sensor 24.

In some instances, controller 20 may alter and/or limit the current (and/or voltage) that is provided to the motor 12 in order to adjust the maximum output torque provided by the motor 12 and/or drive train 14. In some cases, the amplitude of the current (and/or voltage) may be controlled and/or limited. In other cases, other characteristics of the current and/or voltage may be altered or limited. For example, when the motor 12 is drive by a Pulse Width Modulated (PWM) signal, the controller 20 may alter or limit the pulse width of the PWM signal.

It is contemplated that controller 20 may be programmed or otherwise configured to control the operation of motor 12. In some embodiments, as noted above, a bias mechanism 18 may be provided, and may include a return spring that opposes the driving force of motor 12. When so provided, controller 20 may be configured to, for example, operate motor 12 in a manner that permits motor 12 to provide a maximum output torque at the output of the HVAC actuator that remains constant or at least substantially constant over at least a portion of a range of motion of the HVAC actuator. In some cases, the output torque may be constant or at least substantially constant over all or substantially all of the range of motion of HVAC actuator. In some cases, the controller 20 may provide a torque output limit at the output of the motor 12 that increases in accordance with the increasing return spring force provided by the return spring over all or substantially all of the range of motion of the HVAC actuator.

In some instances, drive train 14 may have an output shaft or gear that drives the HVAC component 16. The output shaft or gear may be considered as rotating through a range of motion. In some instances, the range of motion may be defined not in terms of the rotation of the output shaft, but rather in terms of the rotation or other movement of HVAC component 16 in response to the rotating output shaft or gear. In some cases, the range of motion may be defined as the path traveled (either via the output shaft or HVAC component 16) between end points.

Figure 2:
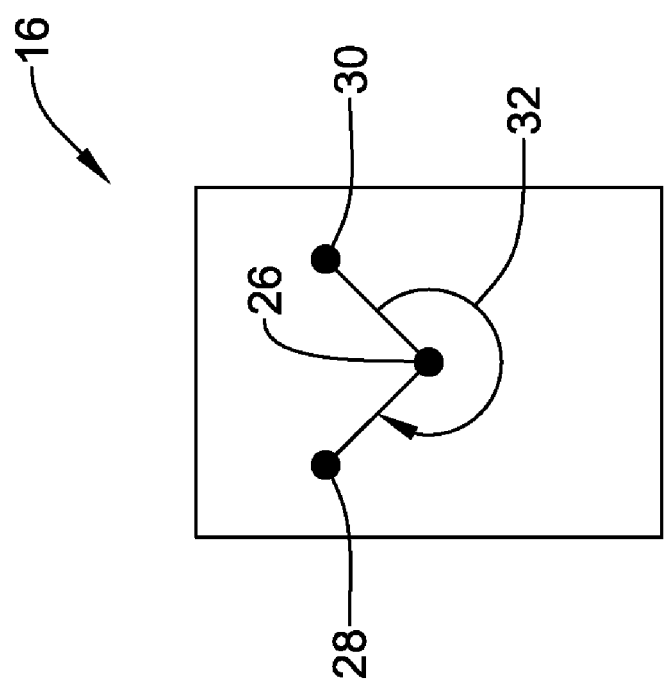
FIG. 2 is a schematic view of an illustrative HVAC component that may be actuated via the spring return actuator of FIG. 1.

Turning briefly to FIG. 2, an illustrative HVAC component 16 is schematically shown as having a shaft 26 that may, for example, be driven by drive train 14 (FIG. 1) as well as being connected to whatever portion of HVAC component 16 may be opened or closed. If HVAC component 16 is an air damper, shaft 26 may be connected to the damper itself. If HVAC component 16 is a fluid valve such as a ball valve, shaft 26 may engage the ball valve ball itself. The illustrative HVAC component 16 is seen as including a first end point 28 and a second end point 30, with a range of motion 32 defined therebetween. In some cases, first end point 28 and/or second end point 30 may represent mechanical limits of drive train 14 (FIG. 1) or the HVAC component 16. In some instances, first end point 28 and/or second end point 30 may be adjustable end points that may, for example, be set by an installer to prevent damage or set other limits to particular aspects or portions of HVAC component 16.

Returning back to FIG. 1, and in some illustrative embodiments, controller 20 may be configured to instruct motor 12, perhaps by controlling the current (and/or voltage) provided to motor 12, to output to drive train 14 an amount of torque that equals or substantially equals a rated torque value plus an amount that is related to the magnitude (but opposite in direction) of the opposing torque provided to drive train 14 by bias mechanism 18. The rated torque may be a predetermined value that provides sufficient torque to sufficiently move HVAC component 16. In other words, controller 20 may be configured to instruct motor 12 to provide a maximum output torque that varies with the opposing torque provided by bias mechanism 18, to thereby provide a constant or substantially constant net torque to HVAC component 16 across the range of motion 32 of the HVAC component 16. In some instances, controller 20 may be considered as regulating motor 12 to provide a variable maximum allowed torque. The maximum allowed output torque may, for example, vary with respect to position along the range of motion 32 (FIG. 2).

In some cases, controller 20 may be programmed with a lookup table that provides values that are related to the opposing torque provided by bias mechanism 18 at a number of different locations or positions along the range of motion 32 (FIG. 2). In some instances, controller 20 may be programmed with a mathematical relationship that relates the current location of the HVAC actuator 16 and bias mechanism 18 opposing torque. It is contemplated that in some cases, controller 20 may be in communication with a sensor (not shown) that provides the controller 20 with an estimate of the actual opposing torque provided by bias mechanism 18, but this is not required. In other cases, the controller 20 may be programmed with a lookup table that provides a value that is related to the maximum output torque of the motor 12 at a number of different locations or positions along the range of motion 32 (FIG. 2).

Figure 3:
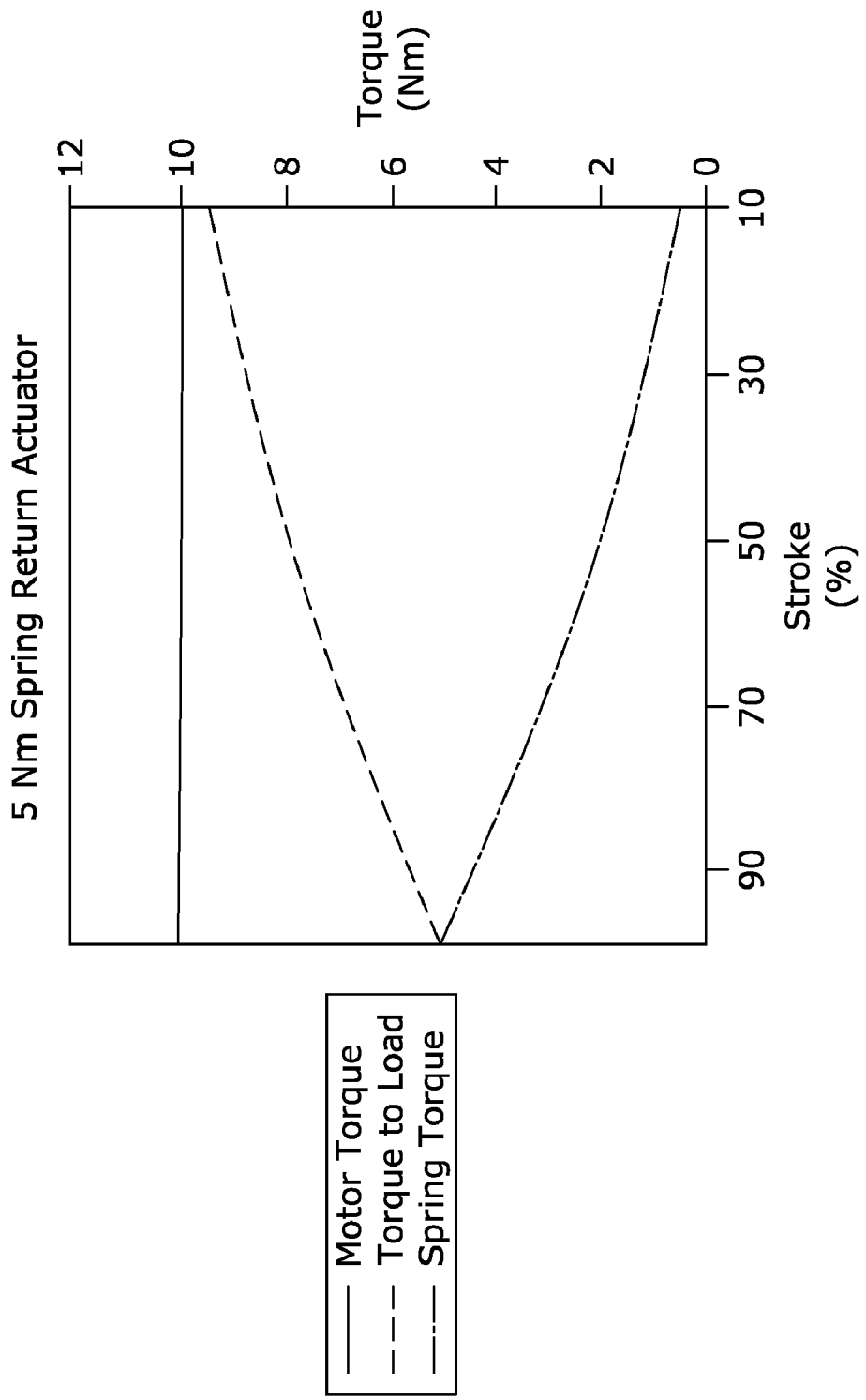
FIG. 3 is a graph showing the torque applied to a load using a constant torque motor.
Figure 4:
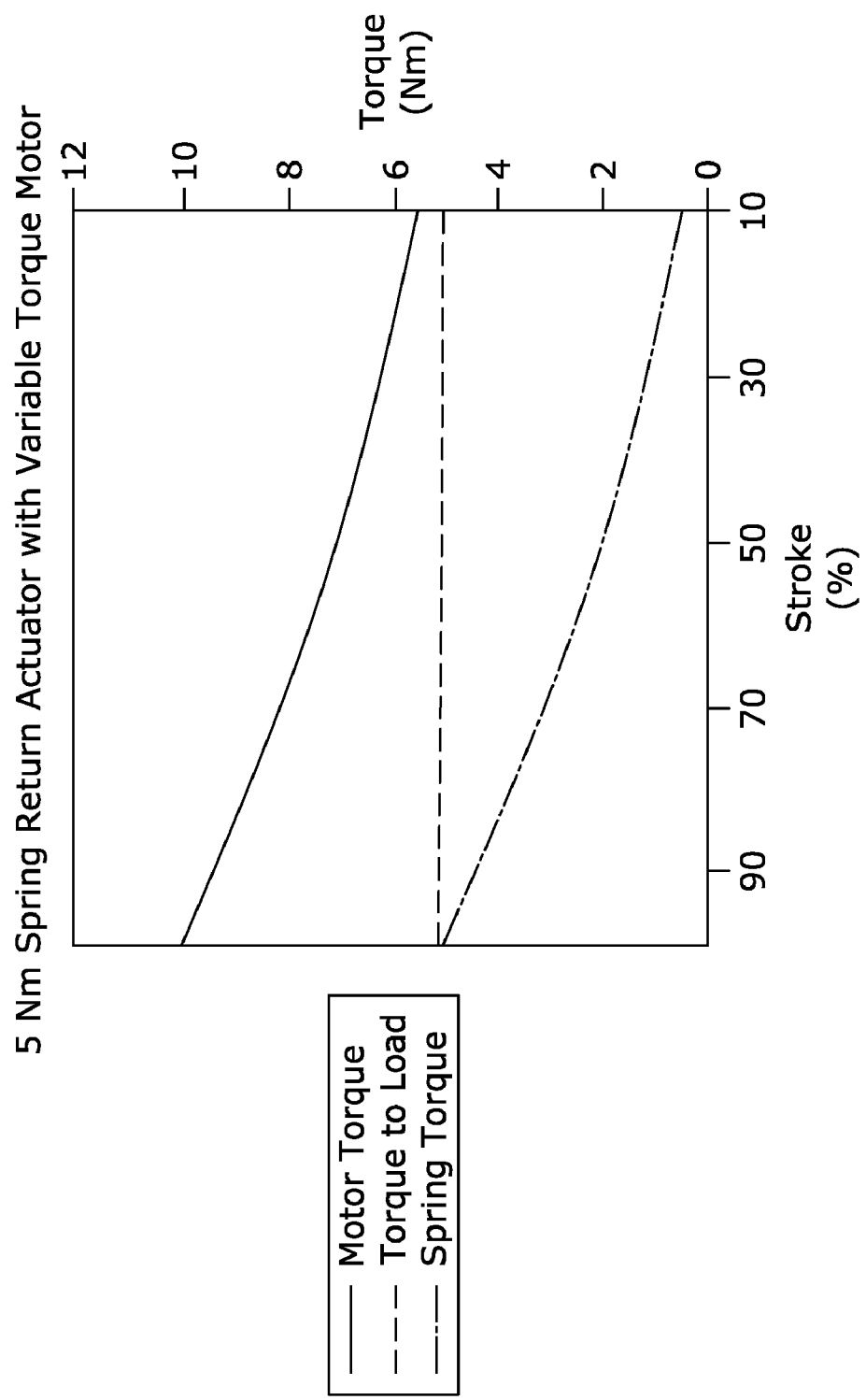
FIG. 4 is a graph showing the torque applied to a load using a variable torque motor.

FIGS. 3 and 4 are graphs illustrating an advantage of using controller 20 to regulate or compensate the maximum output torque provided by motor 12 across a range of motion of an HVAC actuator. In FIG. 3, the motor is illustrated as providing a constant output torque of 10 N·m (Newton meters). It can be seen that the opposing torque provided by the return spring varies in accordance with stroke percentage. The stroke percentage is another way of identifying the current location of an HVAC actuator along the range of motion of the HVAC actuator. As the stroke percentage decreases, or as the spring returns closer to its equilibrium length and/or configuration, the spring force decreases. It will be appreciated that the spring force may be approximated by Hooke's law, which states that the spring force is proportional to elongation (or compression) relative to an equilibrium position. As a result of the constant torque provided by the motor and the non-constant opposing (force) torque provided by the return spring, it can be seen that the torque applied to the load (such as HVAC component 16) varies considerably. To achieve a 5 N·m minimum torque at the load (such as HVAC component 16) at the end of the stroke, a 10 N·m constant torque must be supplied to by the motor.

In contrast, FIG. 4 shows limiting the maximum output torque of the motor across the stroke length. In the example shown, it can be seen that the maximum torque output of the motor changes in accordance with the opposing torque applied by the spring force. At ten percent stroke, the motor outputs about 5.5 N·m of torque while the torque provided by the spring force is about 0.5 N·m. This results in a net torque applied to the load (such as HVAC component 16), at ten percent stroke, of about 5 N·m. As the stroke percent increases, the motor torque and the opposing torque provided by the spring force both increase. It can be seen that the net torque applied to the load remains essentially constant at, in this particular example, about 5 N·m. As a result of providing a constant net torque to the load (such as HVAC component 16), the drive train does not have to be as heavily constructed, particularly when an intervening end point is impacted.

In another illustrative embodiment, controller 20 may have the ability to learn where end points have been set, and/or may be in communication with one or more position sensors (not illustrated) that are disposed proximate any adjustable end-stops. As noted above, and with respect to FIG. 2, first end point 28 and second end point 30 may be predetermined and/or arranged or set by an installer. In some instances, the exact position of first end point 28 and/or second end point 30 may be discovered by controller 20, such as when a blockage is encountered and motor 12 stalls, or may be detected by the aforementioned position sensors disposed proximate any adjustable endstops.

In some cases, spring return actuator 10 (FIG. 1) may also encounter other points along the travel path (such as along range of motion 32, in FIG. 2) that may be unexpected such as temporary blockages (e.g. ice within an air damper). It will be appreciated that, in some cases, the chance of damage occurring to the HVAC actuator increases if motor 12 is operating at full speed when an end stop or blockage is encountered.

If an end stop and/or blockage is discovered, controller 20 may be configured to save the location to a memory. In some cases, the end stop and/or blockage location may be saved to permanent (e.g. non-volatile) memory. As a result, the discovered end stop and/or blockage location will not be lost even if there is a temporary power loss. The location may be determined via one or more of first position sensor 22 or second position sensor 24 (FIG. 1), or by any other suitable technique. During subsequent operation of HVAC component 16 (opening, closing or both), controller 20 may instruct motor 12 to slow down when approaching an identified blockage location or end point.

It will be appreciated that in some instances, spring return actuator 10 may drive HVAC component 16 at a constant or substantially constant motor speed, other than perhaps initial startup or when approaching a known or discovered blockage or known end point. It will be appreciated that when motor 12 first starts, there may be a brief period of time while the torque output by motor 12 must overcome inertia within the motor 12, drive train 14 and HVAC component 16, as well as any frictional forces. When approaching a known blockage position or known end point, the speed may be reduced, but perhaps not instantly, as motor 12, drive train 14 and/or HVAC component 16 may have a certain amount of momentum.

The amount that the motor speed drops when approaching a blockage or end stop position may be programmed into controller 20, and may depend on the physical characteristics of motor 12, drive train 14, HVAC component 16 and the like. In a non-limiting example, motor 12 may have a normal speed of about 3000 rpm. When approaching a blockage position, motor 12 may drop its speed to about 1000 rpm. Again, merely to illustrate but not limit, motor 12 may reduce its speed when, for example, HVAC actuator 16 is about 5 degrees away from the blockage or end point position. This parameter may also be subject to change, depending on the physical characteristics of the individual components.

For example, controller 20 may instruct motor 12 to slow down to a new slower speed that represents a particular fraction of its original speed when drive train 14 is at a particular rotational position relative to the stored or preprogrammed blockage or end point position. Consequently, drive train 14 may be moving more slowly when the blockage or end point is encountered, thereby lessening potential damage to drive train 14, and in some cases, allowing the motor, drive train and/or HVAC component to be manufactured in a less robust manner. It will be appreciated that by slowing down just before reaching a stored blockage and/or end point, rather than simply stopping, HVAC component 16 may be able to be actuated closer to an actual end point, especially if a discovered blockage position has disappeared or has otherwise been overcome. For example, in an air damper, there may be a temporary blockage caused by ice. Once the ice melts, the temporary blockage may disappear and thus drive train 14 is not stopped unnecessarily.

Figure 5:
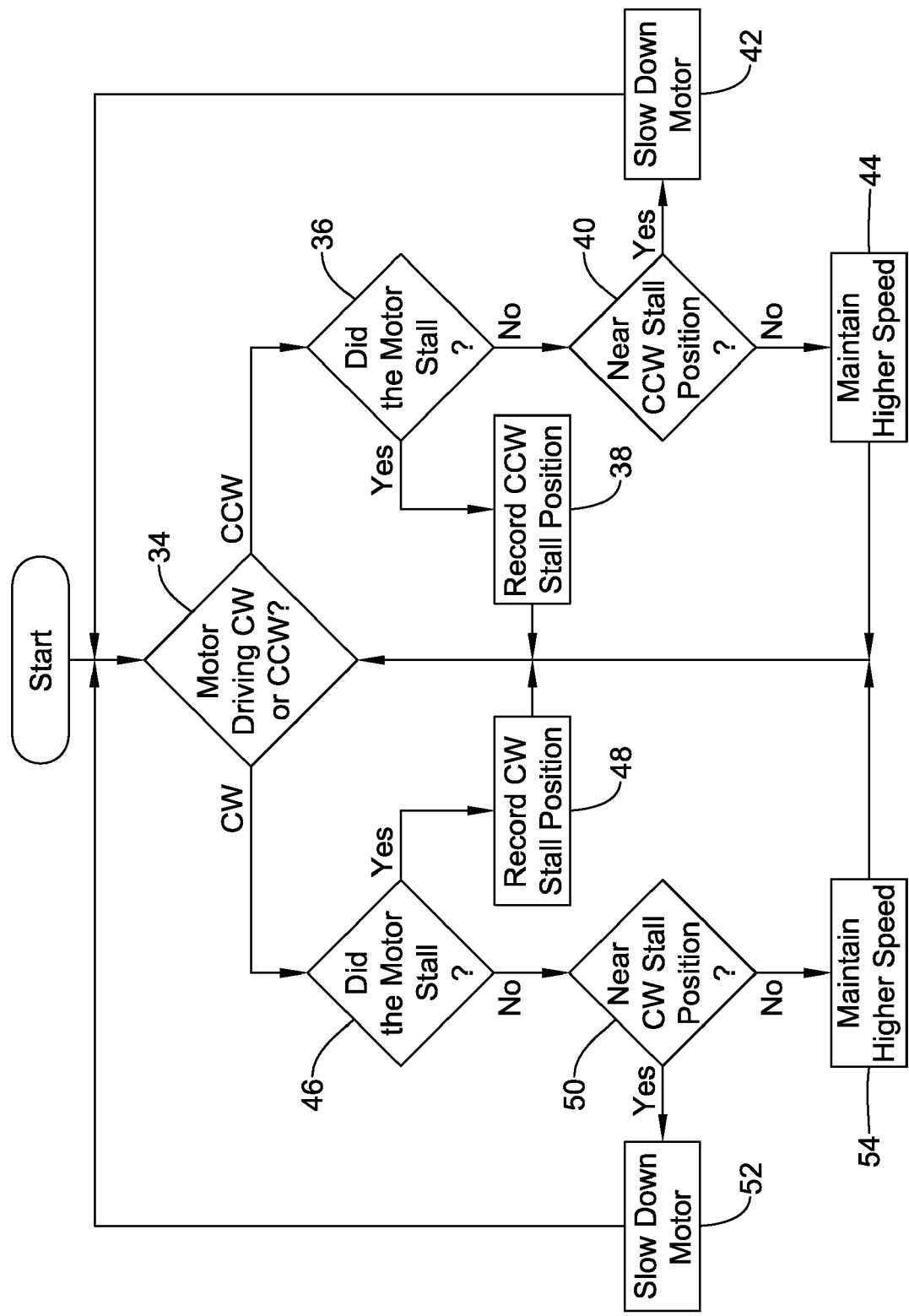
FIG. 5 is a flow diagram showing an illustrative but non-limiting method that may be carried out using an actuator such as the spring return actuator of FIG. 1.

FIG. 5 is a flow diagram showing an illustrative method that may be carried out using an actuator as discussed herein. While FIG. 5 pertains to an actuator that drives the motor in both directions (no return spring), it will be appreciated that this method may also be carried out using a spring return actuator. In FIG. 5, there is a separate flow path for clockwise rotation and counterclockwise rotation. If the actuator includes bias mechanism 18 (FIG. 1), it will be appreciated that one flow path will pertain to driving HVAC component 16 (FIG. 1) from a closed position to an open position (or visa-versa) while the other flow path may not be carried out because bias mechanism 18, rather than motor 12, may be used to drive HVAC component 16 from the open position to the closed position.

In FIG. 5, control begins at decision block 34, where a controller such as controller 20 (FIG. 1) determines if the motor is driving in a clockwise direction or a counterclockwise direction. One of these directions may, for example, drive HVAC component 16 (FIG. 1) towards an open position while the other direction may, for example, drive HVAC component 16 towards a closed position. As noted above, if the actuator includes a bias mechanism such as bias mechanism 18 (FIG. 1), only one side of this flow diagram may be carried out.

If the motor is driving in a counterclockwise direction, control passes to decision block 36, where controller 20 (FIG. 1) determines if the motor has stalled due to a blockage, an end point or for some other reasons. If the motor has stalled, the stall position is recorded in memory, as shown at block 38. Control then reverts to decision block 34. However, if at decision block 36 the motor has not stalled, control passes to decision block 40. At decision block 40, controller 20 determines if drive train 14 (FIG. 1) and/or HVAC component 16 (FIG. 1) is approaching a counterclockwise stall position.

If so, control passes to block 42, where controller 20 slows down motor 12. Control then reverts back to decision block 34. If the apparatus is not approaching a counterclockwise stall position, the current motor speed is maintained, as shown at block 44. Control then reverts to decision block 34.

If at decision block 34, a determination is made that the motor is rotating clockwise, control passes to decision block 46, where controller 20 (FIG. 1) determines if the motor has stalled. If the motor has stalled, whether by reaching a temporary blockage or an end point, the stall position is recorded in memory, as shown at block 48. Control then reverts to decision block 34. However, if at decision block 46 the motor has not stalled, control passes to decision block 50. At decision block 50, controller 20 determines if drive train 14 (FIG. 1) and/or HVAC component 16 (FIG. 1) is approaching a clockwise stall position. If so, control passes to block 52, where controller 20 slows down motor 12. Control then reverts back to decision block 34. If the apparatus is not approaching a clockwise stall position, the current motor speed is maintained, as shown at block 54. Control then reverts to decision block 34.

The disclosure should not be considered limited to the particular examples described above, but rather should be understood to cover all aspects of the invention as set out in the attached claims. Various modifications, equivalent processes, as well as numerous structures to which the invention can be applicable will be readily apparent to those of skill in the art upon review of the instant specification.

What is claimed is:

1. A spring return actuator for driving an HVAC component, comprising:
    a motor;
    a drive train driven by the motor, the drive train being configured to drive the HVAC component;
    a return spring configured to providing a varying opposing torque to the motor across a range of motion of the HVAC component; and
    a controller configured to regulate a maximum output torque of the motor in accordance with the varying opposing torque provided by the return spring such that the drive train outputs a relatively constant maximum torque to the HVAC component across at least part of the range of motion of the HVAC component when the HVAC component is being driven by the motor.

2. The spring return actuator of claim 1, wherein the controller is configured to regulate the motor such that the maximum output torque of the motor equals or substantially equals a design torque value plus an amount related in magnitude to the varying opposing torque of the return spring.

3. The spring return actuator of claim 2, wherein the controller accesses a lookup table for providing a value that is related to the maximum output torque of the motor at each of a plurality of positions along the range of motion of the HVAC component.

4. The spring return actuator of claim 2, wherein the controller is programmed with a mathematical relationship that defines the maximum output torque of the motor in relation to a position along the range of motion of the HVAC component.

5. The spring return actuator of claim 1, further comprising a position sensor in communication with the controller.

6. The spring return actuator of claim 5, wherein the position sensor comprises a Hall sensor.

7. The spring return actuator of claim 5, wherein the position sensor comprises a position potentiometer.

8. The spring return actuator of claim 1, wherein the HVAC component comprises an air damper.

9. The spring return actuator of claim 1, wherein the HVAC component comprises a ball valve.

10. The spring return actuator of claim 1, wherein the spring return actuator has one or more end stop positions, and the controller is configured to slow the speed of the motor when approaching one of the one or more end stop positions.

11. A spring return actuator configured to actuate an HVAC component, the spring return actuator comprising:
 a motor;
 a drive train driven by the motor, the drive train configured to drive the HVAC component between a closed position and an open position along a range of motion therebetween;
 a return spring configured to providing a varying opposing torque to the motor across the range of motion; and
 a controller configured to control the motor, the controller enforcing a maximum torque output limit for the motor, wherein the controller changes the maximum torque output limit by an amount that is related to the varying opposing torque of the return spring as the motor drives the HVAC component.

12. The spring return actuator of claim 11, wherein the maximum torque output limit is at a minimum value when the varying opposing torque of the return spring is at a minimum, and is at a maximum value when the varying opposing torque of the return spring is at a maximum value.

13. The spring return actuator of claim 11, wherein the controller accesses a lookup table that provides maximum torque output limits for a plurality of positions along the range of motion of the HVAC component.

14. The spring return actuator of claim 11, wherein the controller is programmed with a mathematical relationship that defines the maximum output torque limit of the motor along the range of motion of the HVAC component.

15. The spring return actuator of claim 11, wherein the controller is configured to detect an end stop position along the range of motion, and once detected, to subsequently slow the motor speed when approaching the detected end stop position.

16. An actuator for driving an HVAC component, comprising:
 a motor;
 a drive train driven by the motor, the drive train for driving the HVAC component along a range of motion;
 one or more user adjustable end stops for limiting a range of motion of the HVAC component to a user defined range of motion; and
 a controller for controlling the speed of the motor, the controller configured to slow down the speed of the motor as the HVAC component approaches an end stop.

17. The actuator of claim 16, further comprising a position sensor in communication with the controller.

18. The actuator of claim 17, wherein the position sensor comprises a Hall sensor.

19. The actuator of claim 17, wherein the position sensor comprises a position potentiometer.

20. The actuator of claim 16, wherein the controller further provides the motor with a maximum torque output limit that varies over the user defined range of motion.

21. A method for operating a spring return actuator that includes a motor, a drive train driven by the motor for moving an actuator output over a range of motion, and a return spring for providing a varying opposing torque to the motor across at least a portion of the range of motion of the actuator output, the method comprising:
 driving the motor such that the drive train moves the actuator output through at least a portion of the range of motion of the actuator output, including at least part of the range of motion that the return spring provides the varying opposing torque to the motor; and
 while driving the motor and moving the actuator output, changing a maximum torque output limit for the motor by an amount that is related to the varying opposing torque of the return spring.

* * * * *